(12) United States Patent
Roberts et al.

(10) Patent No.: US 11,178,238 B2
(45) Date of Patent: Nov. 16, 2021

(54) COMPUTER-IMPLEMENTED SYSTEM AND METHOD FOR DISTRIBUTED ACTIVITY DETECTION

(71) Applicant: Palo Alto Research Center Incorporated, Palo Alto, CA (US)

(72) Inventors: Michael Roberts, Los Gatos, CA (US); Shane Ahern, Foster City, CA (US); Evgeniy Bart, Santa Clara, CA (US); David Gunning, Seattle, WA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 237 days.

(21) Appl. No.: 15/203,764

(22) Filed: Jul. 6, 2016

(65) Prior Publication Data
US 2018/0013843 A1    Jan. 11, 2018

(51) Int. Cl.
| | | |
|---|---|---|
| *G06F 16/335* | (2019.01) | |
| *G06F 16/9535* | (2019.01) | |
| *H04L 29/08* | (2006.01) | |
| *G06N 20/00* | (2019.01) | |
| *H04W 4/029* | (2018.01) | |
| *G06N 20/10* | (2019.01) | |

(52) U.S. Cl.
CPC ............ *H04L 67/22* (2013.01); *G06F 16/337* (2019.01); *G06F 16/9535* (2019.01); *G06N 20/00* (2019.01); *G06N 20/10* (2019.01); *H04W 4/029* (2018.02)

(58) Field of Classification Search
CPC . H04L 67/22; G06F 17/30702; G06F 16/337; G06F 16/9535; G06N 20/00; G06N 20/10

USPC .................................................... 707/728
See application file for complete search history.

(56) References Cited

U.S. PATENT DOCUMENTS

| | | | | |
|---|---|---|---|---|
| 7,743,050 B1 * | 6/2010 | Bem | ................. | G06F 16/24575 |
| | | | | 707/713 |
| 7,885,844 B1 * | 2/2011 | Cohen | .................... | G06Q 10/10 |

(Continued)

FOREIGN PATENT DOCUMENTS

EP        1850134      10/2007

OTHER PUBLICATIONS

Rello et al., "Detecting Readers with Dyslexia Using Machine Learning with Eye Tracking Measures," May 18-20, 2015, W4A '15 Proceedings of the 12th Web for All Conference, pp. 1-8.

(Continued)

*Primary Examiner* — Ashish Thomas
*Assistant Examiner* — Nargis Sultana
(74) *Attorney, Agent, or Firm* — Burns & Levinson, LLP; Steven M. Mills

(57) ABSTRACT

A computer-implemented system and method for distributed activity detection is provided. Contextual data collected for a user performing an activity is processed on a mobile computing device. The mobile computing device extracts features from the contextual data and compares the features with a set of models. Each model represents an activity. A confidence score is assigned to each model based on the comparison with the features and the mobile computing device transmits the features to a server when the confidence scores for the models are low. The server trains a new model using the features and sends the new model to the mobile computing device.

20 Claims, 6 Drawing Sheets

(56) References Cited

U.S. PATENT DOCUMENTS

| | | | |
|---|---|---|---|
| 8,554,703 B1* | 10/2013 | Lin | G06N 20/00 706/12 |
| 8,868,472 B1* | 10/2014 | Lin | G06N 5/02 706/12 |
| 9,256,785 B2 | 2/2016 | Qvarfordt | |
| 9,280,911 B2* | 3/2016 | Sadeh-Koniecpol | H04L 63/1483 |
| 9,374,434 B2* | 6/2016 | Sylvain | H04M 3/42374 |
| 9,589,560 B1* | 3/2017 | Vitaladevuni | G06K 9/6277 |
| 9,906,539 B2 | 2/2018 | Higbee et al. | |
| 10,330,440 B2 | 6/2019 | Lyren | |
| 2003/0065731 A1* | 4/2003 | Mohammed | H04L 41/28 709/208 |
| 2006/0109237 A1* | 5/2006 | Morita | G16H 40/63 345/156 |
| 2007/0260596 A1* | 11/2007 | Koran | G06F 16/24578 |
| 2008/0294617 A1* | 11/2008 | Chakrabarti | G06F 16/9535 |
| 2009/0077057 A1* | 3/2009 | Ducheneaut | G06Q 30/02 |
| 2010/0241464 A1* | 9/2010 | Amigo | A61B 5/1123 705/4 |
| 2011/0125678 A1* | 5/2011 | Partridge | G06N 20/00 706/12 |
| 2011/0302169 A1* | 12/2011 | Brdiczka | G06Q 30/02 707/740 |
| 2012/0041969 A1* | 2/2012 | Priyadarshan | G06Q 30/0201 707/769 |
| 2012/0257733 A1* | 10/2012 | Kosseifi | G06Q 10/06311 379/93.17 |
| 2012/0310587 A1* | 12/2012 | Tu | G01D 1/16 702/141 |
| 2013/0009993 A1* | 1/2013 | Horseman | G16H 40/63 345/633 |
| 2013/0262216 A1* | 10/2013 | Zhang | G06Q 30/02 705/14.36 |
| 2013/0271454 A1* | 10/2013 | Lyons | G06F 3/04897 345/419 |
| 2013/0325970 A1* | 12/2013 | Roberts | H04N 21/4788 709/206 |
| 2014/0237595 A1* | 8/2014 | Sridhara | G06F 21/55 726/23 |
| 2014/0257540 A1* | 9/2014 | Pacione | G09B 19/00 700/91 |
| 2014/0280208 A1* | 9/2014 | McConky | G06F 16/24578 707/748 |
| 2014/0282257 A1* | 9/2014 | Nixon | G06F 3/04842 715/835 |
| 2015/0131850 A1* | 5/2015 | Qvarfordt | G06F 3/013 382/103 |
| 2015/0134612 A1* | 5/2015 | Silberstein | G06F 16/27 707/634 |
| 2015/0193695 A1* | 7/2015 | Cruz Mota | H04L 63/1425 706/12 |
| 2015/0262067 A1* | 9/2015 | Sridhara | H04L 63/14 706/12 |
| 2015/0289797 A1* | 10/2015 | Pacione | A61B 5/1112 600/301 |
| 2015/0324686 A1* | 11/2015 | Julian | G06N 3/08 706/25 |
| 2016/0093154 A1* | 3/2016 | Bytnar | G07F 17/3237 463/25 |
| 2016/0119364 A1* | 4/2016 | Zolli | G06Q 50/01 726/26 |
| 2016/0140481 A1* | 5/2016 | Huang | G06Q 10/06313 705/7.15 |
| 2016/0142435 A1* | 5/2016 | Bernstein | H04L 63/1441 726/23 |
| 2016/0283887 A1* | 9/2016 | Jagyasi | G06Q 10/06398 |
| 2016/0314627 A1* | 10/2016 | Fish | H04L 65/1069 |
| 2016/0321616 A1* | 11/2016 | Gedge | G06F 16/24578 |
| 2016/0358065 A1* | 12/2016 | Gedge | G06N 20/00 |
| 2016/0359993 A1* | 12/2016 | Hendrickson | H04L 51/32 |
| 2016/0379136 A1* | 12/2016 | Chen | G06F 21/552 706/12 |
| 2017/0032248 A1* | 2/2017 | Dotan-Cohen | H04L 67/306 |
| 2017/0126963 A1* | 5/2017 | Todasco | H04N 5/23218 |
| 2017/0140285 A1* | 5/2017 | Dotan-Cohen | H04W 4/02 |
| 2017/0163503 A1* | 6/2017 | Black | G09B 7/00 |
| 2017/0177833 A1* | 6/2017 | Lewallen | G09B 19/0038 |
| 2017/0178024 A1* | 6/2017 | Kida | G06N 20/00 |
| 2017/0187807 A1* | 6/2017 | Clernon | H04L 41/0806 |
| 2017/0279827 A1* | 9/2017 | Savalle | H04L 69/22 |
| 2017/0289769 A1* | 10/2017 | Ceker | G06F 16/9535 |
| 2017/0309196 A1* | 10/2017 | Vangala | G09B 19/00 |

OTHER PUBLICATIONS

Eivazi et al., "Predicting Problem-Solving Behavior and Performance Levels from Visual Attention Data," Feb. 13, 2012, 2nd Workshop on Eye Gaze in Intelligent Human Machine Interaction, pp. 9-16 (Year: 2012).

Ratwani et al., "A Real-Time Eye Tracking System for Predicting and Preventing Postcompletion Errors," Human-Computer Interaction, 2011, vol. 26, pp. 205-245 (Year: 2011).

Vo, C.C., Torabi, T., Loke, S.W. (2009). "Towards Context-Aware Task Recommendation," 2009 Joint Conferences on Pervasive Computing (JCPC). doi:10.1109/jcpc.2009.5420173 (Year: 2009).

Hastie et al., "Automatic Evaluation: Using a DATE Dialogue Act Tagger for User Satisfaction and Task Completion Prediction", 2002, Proc. Lang. Resources Eval. Conf, pp. 1-8 (Year: 2002).

* cited by examiner

COMPUTER-IMPLEMENTED SYSTEM AND METHOD FOR DISTRIBUTED ACTIVITY DETECTION

FIELD

This application relates in general to determining context, and in particular to a computer-implemented system and method for distributed activity detection.

BACKGROUND

Contextual intelligence can provide an in-depth understanding of an individual's context, including actions performed by that individual. In turn, knowledge of an individual's context at a particular time can be used to anticipate a need of that individual and provide personalized recommendations. The ability to anticipate a user's needs and provide personalized recommendations can help businesses increase revenue, as well as customer satisfaction and customer base. For example, a user is determined to be walking near four different restaurants in downtown Seattle at 5:30 p.m. on a Saturday night. Based on the time and the user's location, as well as a history of the user's food likes and dislikes, one or more of the restaurants can be provided to the user as a recommendation for dining. Additionally, coupons or other discounts can also be provided with the recommendation.

Unfortunately, detecting fine-grained activities performed by an individual to provide accurate recommendations is demanding due to requiring the transmission and processing of large amounts of data, which are typically performed server side. However, detecting activities via models, using high-frequency data, is superior to models operating on data collected at lower frequencies. For instance, data collected at high frequencies for individual users better identifies subtle differences between signs of context expressed by different users and can detect small changes.

Therefore, there is a need for an approach to identifying user context via models based on high frequency data collected for each individual, while decreasing the amount of time and processing required by a server to identify the context. Preferably, the approach will offset some of the expense typically borne by the server and reduce an amount of data flowing to the server so that the server can support a large number of users, while still utilizing large amounts of high-frequency data.

SUMMARY

To ensure accurate detection of fine-grained activities for a large number of users, distributed activity detection can be performed. Contextual data is collected for a user via one or more mobile computing devices. Features are extracted from the data to generate a feature vector. The feature vector is then compared with one or more activity models stored on the mobile computing device and a similarity measure is determined for each model. If one of the models satisfies a predefined amount of similarity to the feature vector, an activity associated with that model is assigned. However, if none of the models satisfy the similarity, the user is requested to identify the activity being performed and the identified activity is transmitted to a server with the feature vector for training a new model. Once trained, the server transmits the new model to the mobile computing device for running.

An embodiment provides a computer-implemented system and method for distributed activity detection. Contextual data collected for a user performing an activity is processed on a mobile computing device. The mobile computing device extracts features from the contextual data and compares the features with a set of models using a predefined comparison function. Each model represents an activity. A confidence score is assigned to each model based on the feature comparison and the mobile computing device transmits the features to a server when the confidence scores for the models are low. The server trains a new model using the features and sends the new model to the mobile computing device.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Accurately identifying fine-grained activities can require large amounts of contextual data for each individual user. Generally, the data is transmitted from a collecting device, such as a mobile computing device to a server for detection of the activity. Processing and analyzing the data, on the server, for multiple individuals can be extremely time consuming and costly. To decrease the time and cost, smaller amounts of contextual data can be collected and processed for each individual. However, the use of smaller amounts of data can lead to less precise results for activity determination. Accordingly, a process for reducing the time and cost for processing using large amounts of data to identify activities is favored and can be performed by storing common activity models on a mobile device for fast detection, while sending data for an undetected activity to a server for training a new model. Subsequently, the model is then transmitted to the mobile device for later use.

Figure 1:
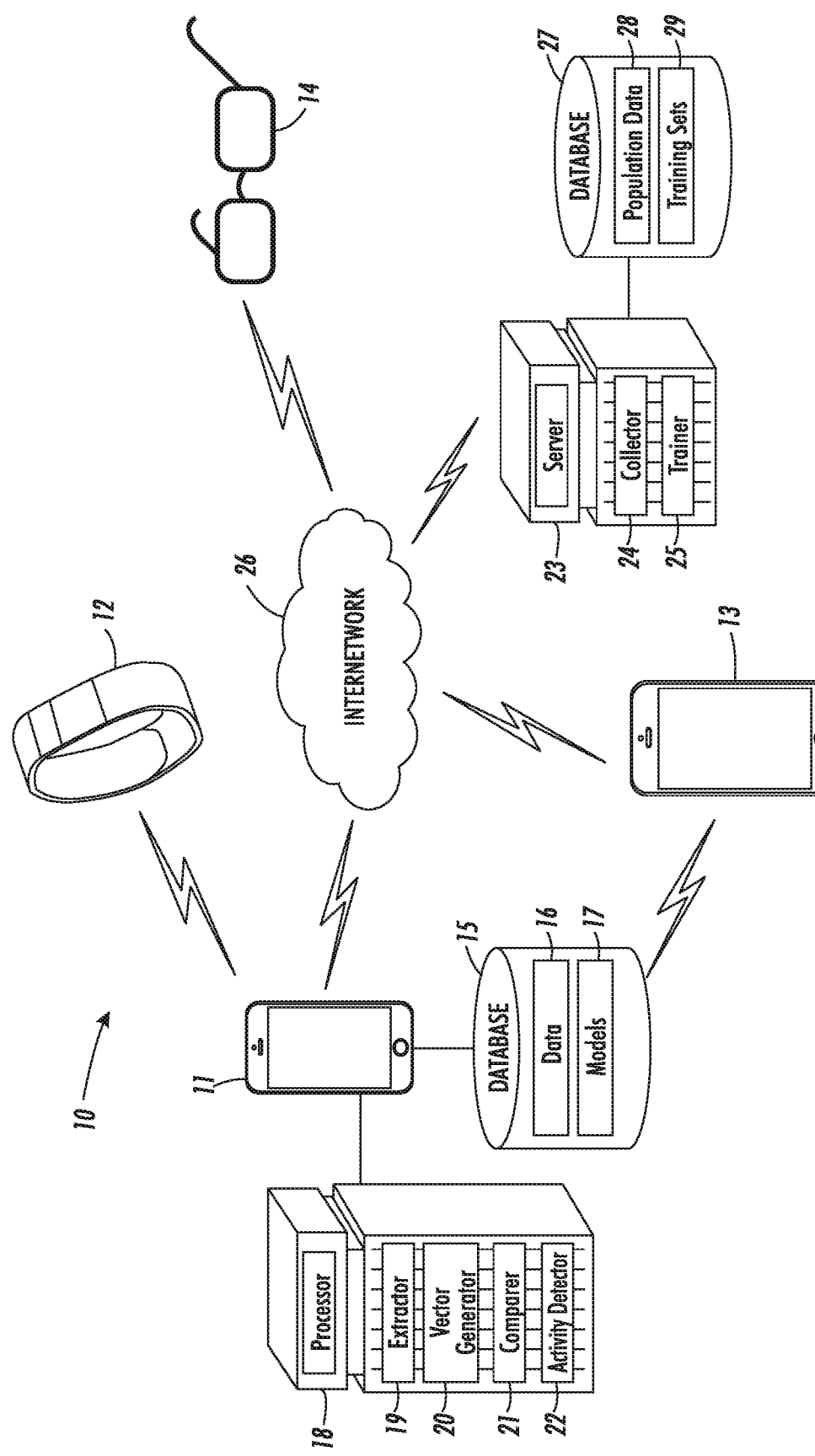
FIG. 1 is a block diagram showing a computer-implemented system for distributed activity detection, in accordance with one embodiment.

Distributed activity detection can decrease an amount of time needed for processing of large amounts of data, as well as reduce the amount of processing required by a server, which traditionally performs the activity detection. FIG. 1 is a block diagram showing a computer-implemented system 10 for distributed activity detection, in accordance with one embodiment. A user is associated with one or more mobile computing devices, such as a cell phone 11, smart watch 12, tablet 13, or a head-mounted computing device 14, such as Google Glass, by Google Inc. Each of the devices 11-14 can collect contextual data 16 for the user via one or more sensors during an activity being performed. The contextual data 16 can include location data, text messages, emails, photographs, video data, and acceleration data, as well as other types of data. The contextual data 16 can be stored on the respective computing devices, such as in a database 15 associated with that device, as well as transmitted to one or more other devices 11-14. The databases 15 can also store a set of models 17, wherein each model represents an activity. In one embodiment, one of the devices is selected as the main device on which the data will be processed. For example, each of the devices 12-14 sends their data to the cell phone 11 for analysis and activity determination. Alternatively, each device can analyze and process the contextual data 16 separately.

To analyze the contextual data, each device 11-14 can include a processor 18. The processor 18 can include an extractor 19, a vector generator 20, a comparer 21, and an activity detector 22. The extractor 19 performs feature extraction on the collected contextual data 16. Subsequently, the vector generator 20 generates a vector of the extracted features, and the comparer 21 compares the feature vector with each activity model 17 stored on that device, using a comparison function. The activity detector 22 identifies one of the models that most closely resembles the feature vector and that satisfies a predetermined amount of similarity. Subsequently, an identification label for the activity associated with the identified model is assigned to the feature vector representing the action performed by the user.

However, if the feature vector is not related to or similar to any of the models 17 stored on the mobile device 11-14, the mobile device prompts the user to provide a label, or identification, of the activity associated with the feature vector. In a further variation, the user can be prompted to label features at a later time, using, for example, a web-application. Once the feature vector is labelled, the mobile device or labelling application then transmits the label provided by the user and the feature vector to a server 23, such as via an internetwork 26, including the Internet. The server 23 can include a collector 24 and a trainer 25, and is interconnected to a database 27, which stores population data 28 and training sets 29. The collector 24 receives the feature vector and the activity label associated with the contextual from one or more of the mobile devices and/or feature labelers 11-14, and the trainer 25 utilizes the feature vector and activity label to train a new model that recognizes the activity associated with the feature vector. Subsequently, the new model is transmitted to one or more of the mobile computing devices for storing and use in identifying further activities performed by the user. Additionally, the model could optionally be transmitted to devices other than the user's devices.

The mobile computing devices 11-14 and server 23 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
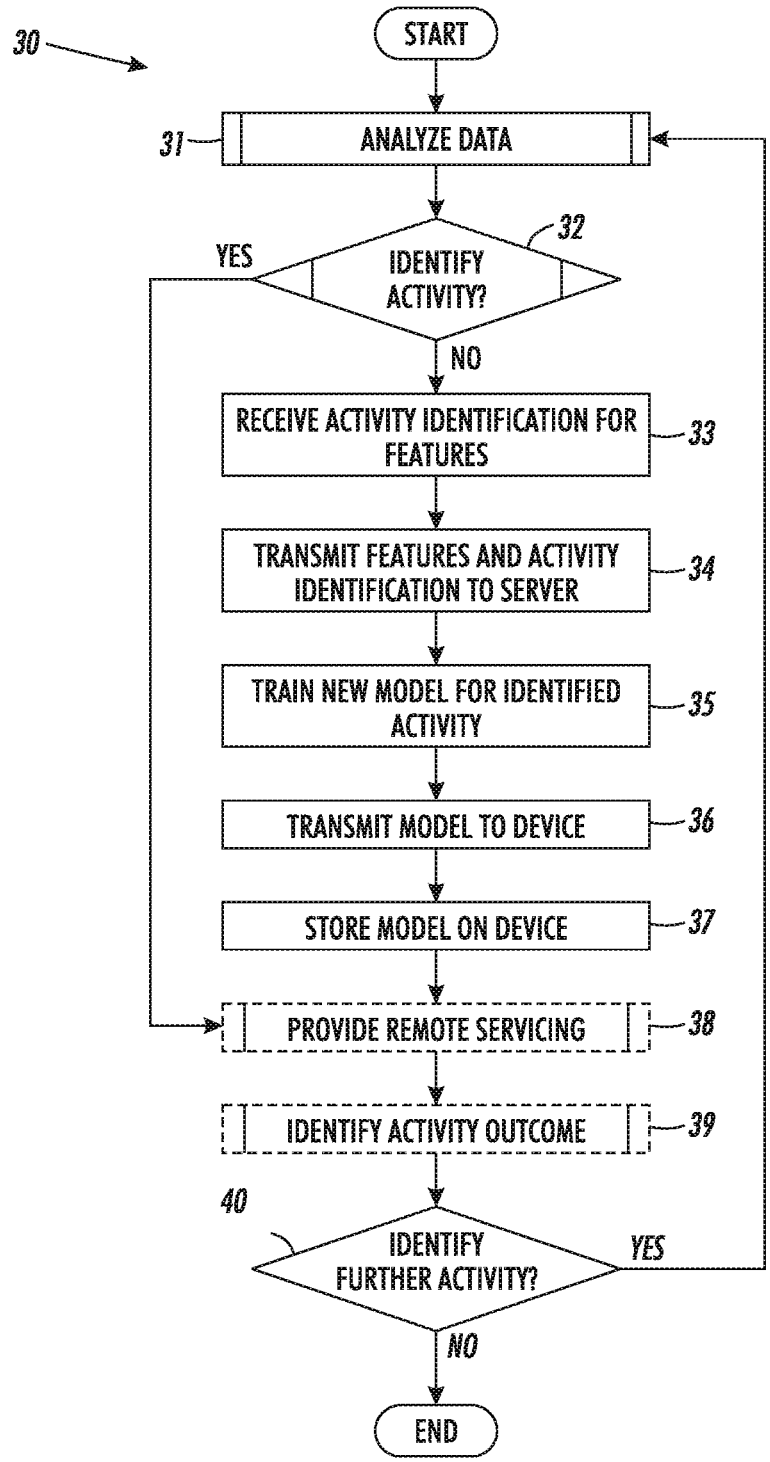
FIG. 2 is a flow diagram showing a computer-implemented method for distributed activity detection, in accordance with one embodiment.

Separating training of the activity models and activity detection can result in faster and more accurate detection by offsetting some of the processing generally required by a server. Once identified, the activities can be used to anticipate a need of a user and provide recommendations or assistance. FIG. 2 is a flow diagram showing a computer-implemented method 30 for distributed activity detection, in accordance with one embodiment. Contextual data associated with a user is analyzed (block 31) via one or more mobile devices in an attempt to identify (block 32) an activity being performed by the user. In one example, a user is travelling to downtown Seattle for a meeting and is carrying his cell phone. The cell phone collects location information of the user via GPS, accesses a calendar and identifies the meeting, which is scheduled from 2-4:30 p.m. and takes place at 500 Union Street. However, the accelerometer data indicates a reading of zero, GPS identifies that the user is located 2.5 miles from the meeting location, and a head-mounted computing device identifies that the user is outside of the car looking at the tires.

If the activity is identified (block 32), an activity identification label is assigned to the contextual data. In one embodiment, the assigned activity label can be provided to the user for confirmation, change, or feedback. Upon identification or confirmation of an activity, remote servicing can optionally be provided (block 38), as further described below with reference to FIG. 5, or an outcome of the identified activity being performed can optionally be predicted, as further described below with reference to FIG. 6.

If a label for the activity is not identified (block 32), the mobile device requests (block 33) the user to provide a label identifying the activity. In one embodiment, the user can receive the request as a notification on one of the associated mobile computing devices, for example, the mobile device that analyzed the contextual data. The notification can request that the user identify their current activity or confirm that they are still performing a previously identified activity. The user can identify his current activity by selecting an activity from a list of activities provided with the notification or by entering text for a label identifying the activity. In a further embodiment, the mobile computing device can consult a server-side directory of activities taking place, or having taken place, at the user's location to identify the activity being performed by the user. The server-side directory can be informed by the activities of other users at the location. In this way, the system can learn user-specific variations of activities commonly performed at particular locations.

Upon receipt of the activity label, the mobile device transmits (block 34) the contextual data and the activity label to a server. The server adds the contextual data and label to a training set and when the server has accumulated an appropriate amount of labeled activities, a new model can be trained (block 35) to recognize the labeled activity. An appropriate amount of labeled activities can be determined based on a threshold or on a predetermined number or range of labeled activities. Based on the training, the server generates a parametric description of the new model for sending (block 36) to the mobile computing device. Once received, the mobile computing device generates the new model, which is stored (block 37) for running on a persistent basis to identify any further performances of that activity by the user. Next, one or more recommendations can optionally be selected (block 38) and transmitted to the user based on the identified activity. Additionally, an outcome of the identified activity can optionally be predicted (block 39) based on the contextual data. Subsequently, a determination (block 40) is made as to whether further contextual data has been collected for identifying a further activity. If so, the further contextual data is analyzed (block 31) in an attempt to identify (block 32) the activity associated with the further contextual data. However, if no further contextual data remains for analysis, the process ends.

Returning to the above-identified example, no activity was identified for the collected contextual data of the stopped user looking at his car. The user receives a notification asking him what activity he is performing and the user responds via text that he is attempting to change a flat tire. The collected contextual data and the activity label provided by the user are sent to the server for training a new model. The new model is then transmitted to the mobile device for running to identify any further instances of the user performing a tire change. When a further instance of the user changing his tire is detected, contextually relevant servicing can be provided, such as by identifying and sending a recommendation to the user regarding changing a tire or by connecting the user with another user experienced in changing tires. In addition or in lieu of the contextually relevant servicing, an outcome of the tire changing activity can be predicted based on the contextual data collected from the user during the activity. Based on the predicted outcome, additional assistance may be provided to the user.

Figure 3:
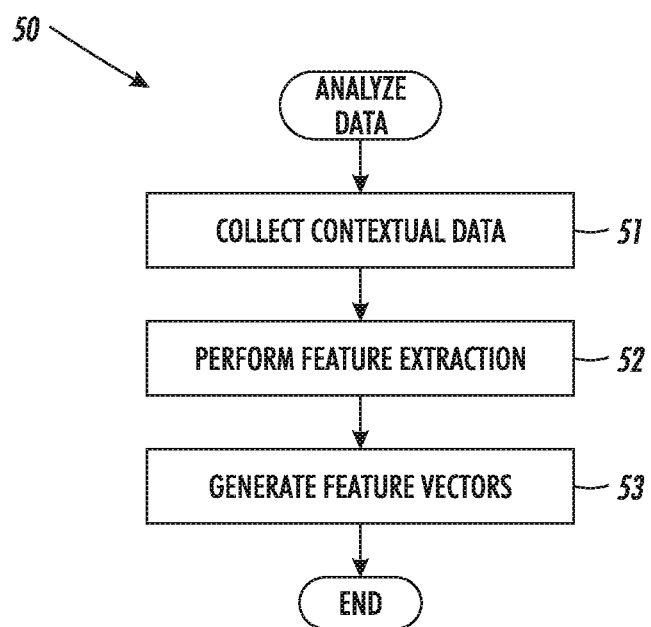
FIG. 3 is a flow diagram showing, by way of example, a process for analyzing contextual data.

Prior to determining an activity, the contextual data collected is analyzed. FIG. 3 is a flow diagram showing, by way of example, a process 50 for analyzing contextual data. One or more mobile devices associated with a user can collect (block 51) contextual data during the performance of an activity by a user, such as via GPS, an accelerometer, camera, voice recorder, email, telephone calls, and text messaging. The contextual data can include accelerometer readings, location data, pictures, sound recordings, temperature, and time, as well as other types of data that can be collected or determined via a mobile computing device.

Once the contextual data has been collected, the mobile device performs (block 52) feature extraction on the data to identify features that are representative of the data. Feature extraction can be performed based on the type of contextual data being processed. For example, an FFT histogram can be computed for the accelerometer readings of the device to indicate how much energy exists at each point along a spectrum, a light sensor reading can be quantized to a normalized 0-1 value, a set of running applications on the device can be analyzed and identified, and readings from the GPS sensor can be clustered to detect significant locations. Additionally, meetings and times can be extracted from a calendar, identities of people or locations can be identified from text messages and emails, and location with respect to an object or structure can be determined via video or photograph data. Other types of examples for extracting features from the contextual data are possible.

The extracted features are then used to generate (block 53) a feature vector. Each extracted feature can represent a single dimension, such that the feature vector has a dimensionality equal to the number of features extracted from the contextual data for the activity associated with the vector. The feature vectors for different activities can be represented in a feature space, which is non-linear. The feature space provides an indication of relation between two or more of the activities represented by the feature vectors. Some of the activities can be separated from other activities by a large Euclidian or Cosine distance, while the separation for other activities is smaller. Upon determination, the feature vector can then be used in an attempt to identify the activity represented via activity models or to train a new activity model, if the activity cannot be identified.

Figure 4:
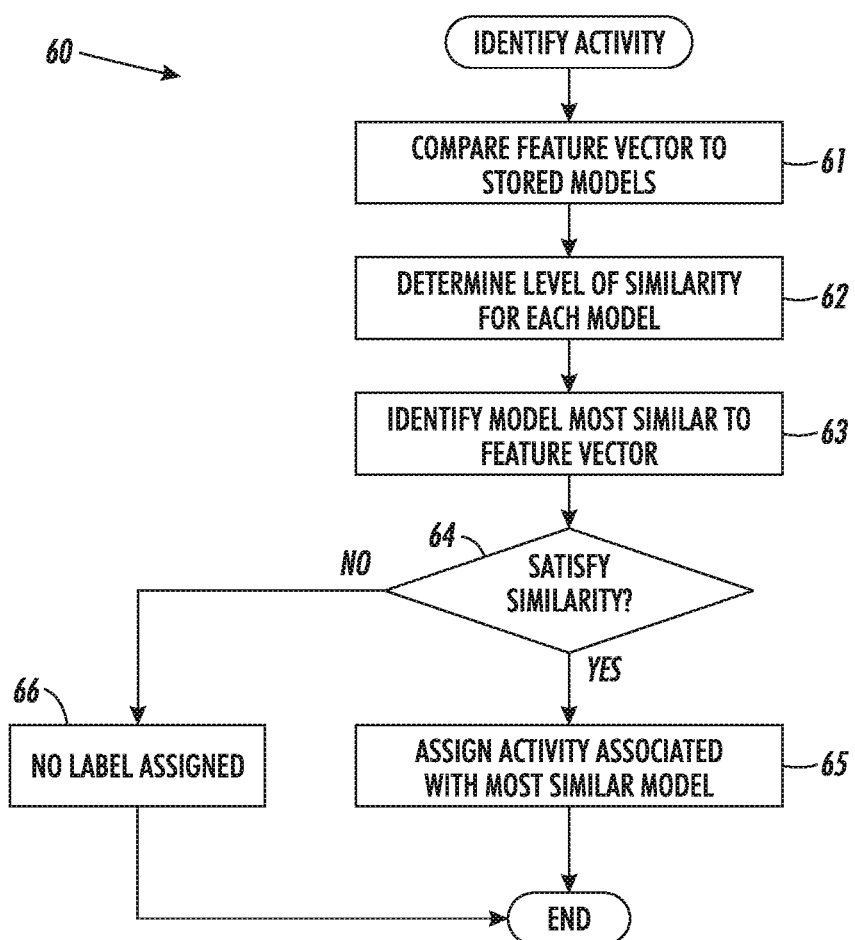
FIG. 4 is a flow diagram showing, by way of example, a process for identifying an activity.

Activity detection is first attempted on a mobile computing device to increase the speed and accuracy of the activity determination by preventing unnecessary transfers of large amounts of data to a server for analysis. FIG. 4 is a flow diagram showing, by way of example, a process 60 for identifying an activity on a mobile computing device. The feature vector is compared (block 61) with activity models stored on the mobile computing device. Each activity model can be first trained on a server to recognize a particular activity or a set of activities and then, transferred to the mobile computing device. In one embodiment, the initial activity models provided to the mobile computing device of a user can be trained using population data, models from other users, or models generated via a different method for the user. When sufficient amounts of contextual data have been collected for the user of the mobile computing device, the initial models can then be supplemented or replaced with the user specific models that are generated based on actions of the user. In a further embodiment, training can occur using a combination of labeled population data indexed by activity labels and the user's specific data. The two types of data can be weighed evenly or a higher weight can be assigned to either the population data or the user's specific data.

Model training can be performed on a server, and the same or different machine learning techniques for generating models can be used for different activities. In one embodiment, a parametric Support Vector Machine (SVM) model can be used; however, other types of machine learning are also possible, for example, Tensor representations. Training can occur by the server at any time, or alternatively, the load of the server can be monitored and training can occur at times when the server is less loaded. Additionally, training can be scheduled at times when the server is typically known to be less loaded. If multiple models exist for an activity, the server can automatically select which model to send to the mobile computing device for running.

For each comparison of the feature vector and an activity model, a level of similarity can be determined using some specific function (block 62). The similarity can be determined as a value or as a probability that a particular activity model supports the feature vector. In one example, the activity model with the highest similarity value or probability value can be selected (block 63) as representative of the feature vector. However, in addition to, or in lieu of, determining a highest value or probability, a threshold can be applied to determine whether model associated with the highest value or probability satisfies (block 64) a required amount of similarity to ensure that that the activity is an accurate representation of the feature vector. Use of the threshold prevents a model from being selected merely because the model has the highest similarity to the feature vector, when the model is truly not a good representation of the feature vector. Alternatively, a range of similarity or probability can be used in lieu of the threshold.

If the level of similarity is satisfied by a model, a label of the activity associated with that model is selected and assigned (block 65) to the feature vector. Once assigned, the activity label can optionally be provided to the user for confirmation or for relabeling with a different activity or different label for the activity. Relabeling of the activity can prompt retraining of the models via the server.

However, if the level of similarity is not satisfied, no activity labels are assigned (block 66) to the feature vector. As described above with reference to FIG. 2, those feature vectors, for which an activity cannot be identified by a mobile computing device, are sent to a server with activity labels provided by the user, for training a new model by generating parametric data. Subsequently, the parametric data for the new model is transmitted from the server to the mobile computing device for generating the new model and use in identifying further occurrences of the associated activity.

Figure 5:
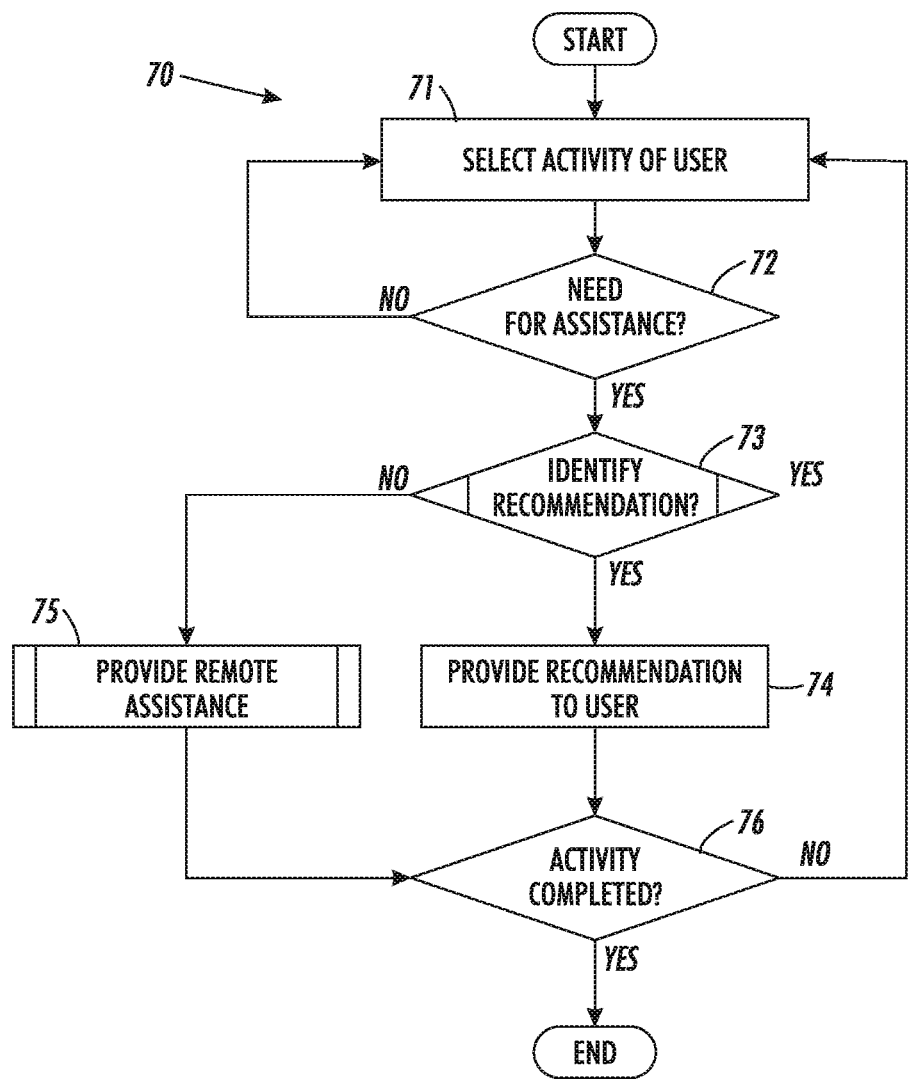
FIG. 5 is a flow diagram showing, by way of example, a process for providing remote servicing.

Once an activity performed by the user is identified, the activity can be used to provide contextually relevant servicing to the user, including offering recommendations and remote assistance, if needed. FIG. 5 is a flow diagram showing, by way of example, a process 70 for providing remote servicing. In one embodiment, a customer requiring servicing can submit a request to a service provider via a telephone call, Instant Messaging, SMS text messaging, or email. The request can include a service to be performed along with the customer's name, address, and customer number. Other data items for inclusion in the request are possible. Alternatively, the need for servicing can be inferred based on the user's context, including activity being performed, or can be automatically offered.

An identified activity being performed by the user is selected (block 71) and used to determine or anticipate (block 72) a need for assistance by the service provider. If no need for help exists (block 72), a further activity is selected (block 71) to determine if and when assistance can be provided. However, if help or advice would be necessary or useful to the user, one or more recommendations can be identified (block 73) and provided (block 74). The recommendations can each be selected based on identifying tasks commonly performed during the identified activity or a related activity by prior users. However, if no recommendations can be identified to fulfill the users need, remote assistance (block 75) can be provided via initiating communication with a knowledgeable individual to assist the user.

Upon providing a recommendation or remote assistance, a determination is made as to whether the user has completed (block 76) the activity. If so, then the context-based service optimization ends until another activity is selected. Alternatively, a context of the user continues to be monitored until the activity is completed. Remote servicing is further described in detail in commonly-owned U.S. patent application Ser. No. 15/203,752 entitled "Computer-Implemented System and Method for Providing Contextually Relevant Servicing," filed on Jul. 6, 2016, pending, the disclosure of which is incorporated by reference.

Figure 6:
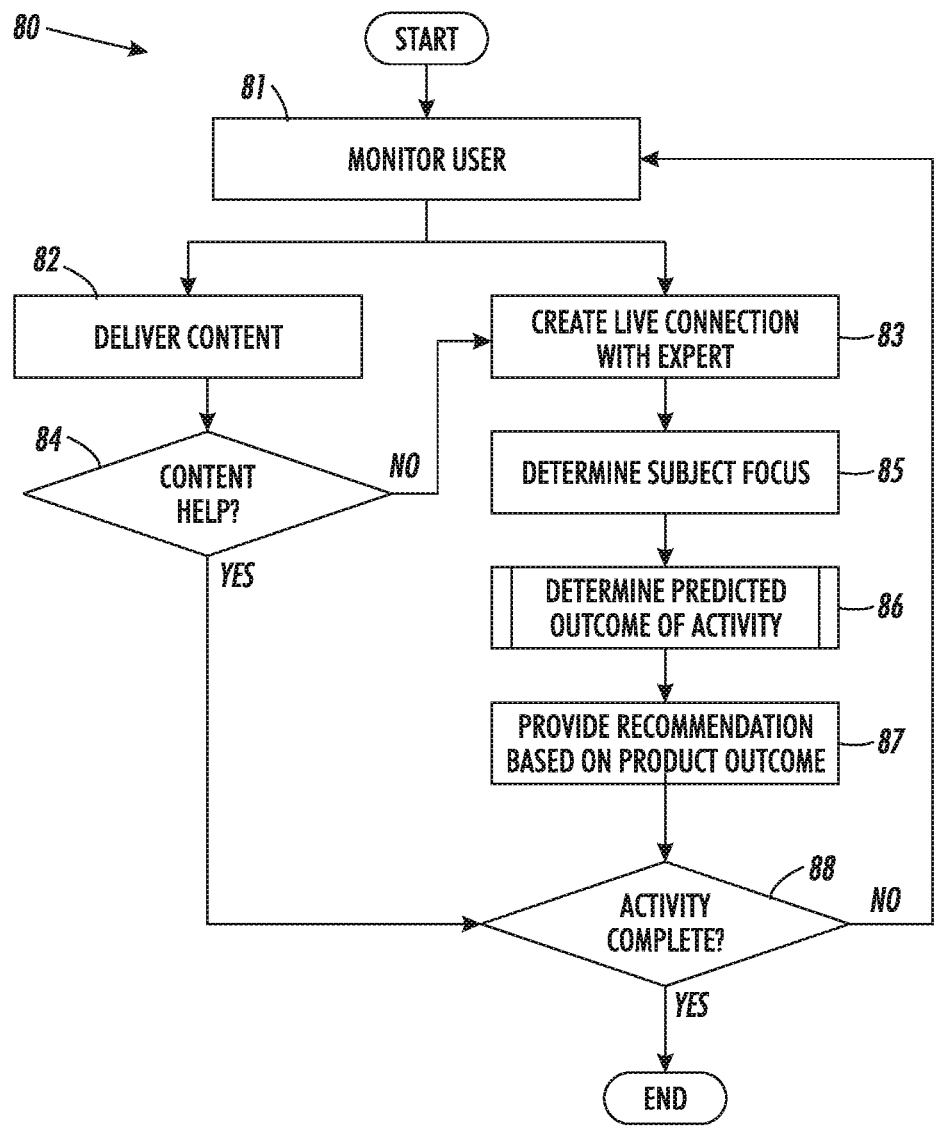
FIG. 6 is a flow diagram showing, by way of example, a process for predicting activity outcome.

Additionally, upon determination of an activity, an outcome of that activity can optionally be predicted. FIG. 6 is a flow diagram showing, by way of example, a process 80 for predicting activity outcome. Monitoring of the user commences (block 81) after identifying the activity being performed by a user. Based on the activity, servicing materials can be delivered (block 82) to the user to assist with the activity being performed. Alternatively, remote assistance can be performed (block 83) by the connecting the user with an expert for live assistance.

If servicing material is sent (block 82) to the user, a determination (block 84) is made as to whether the servicing material is helpful to the user or whether the user requires additional assistance. If the servicing material is helpful, and no further assistance is necessary, a determination (block 88) is made as to whether the activity has been completed and if so, no further monitoring of the user is required for that particular activity, but monitoring may continue until the service is completed. However, if the activity has not been completed (block 88), further monitoring of the user is performed (block 81).

When the user requires further assistance, in addition to the servicing material, or in lieu of the servicing material, remote assistance can be initiated (block 83) to connect the user with a live expert or individual with knowledge or expertise of the activity or need of the user. During remote assistance, contextual data of the user is obtained and used to determine a subject of focus (block 85) of the user. Subsequently, an outcome of the activity performed by the user can be predicted (block 86) using the subject of focus. The outcome can include a positive outcome, neutral outcome, or negative outcome with respect to completion of the activity.

Based on the predicted outcome, a relevant recommendation can be identified and provided (block 87) to the user to ensure that the user successfully completes the activity. The recommendation can include servicing material, such as reference materials, training manuals, or step-by-step instructions, as well as helpful hints or tips, and examples. The recommendation can be selected based on the activity being performed, the subject of focus of the user, and the predicted outcome of the activity. Finally, a determination (block 88) is made as to whether the activity has been successfully completed. If so, then the process ends and no further monitoring of the user is required since the service requested has been fulfilled. However, if further activities remain, monitoring of the user continues (block 81). Predicting an outcome of the activity is further described in detail in commonly-owned U.S. patent application Publication, Ser. No. 2018/0012126, published on Jan. 11, 2018, the disclosure of which is incorporated by reference.

In addition to providing contextually relevant servicing and predicting an activity outcome to provide further assistance, a group of qualified individuals can be identified for assisting the user in person, unlike remote assistance, as described in further detail in commonly-owned U.S. patent application Publication, Ser. No. 2018/0012170, published on Jan. 11, 2018, the disclosure of which is incorporated by reference. For instance, a user is identified as performing protein purification in which a hazardous chemical is used. The user is continually monitored throughout the purification process and further activities of the user are identified, including the user spilling the hazardous chemical. Based on the spill action, a recommendation is provided to the user to leave the room without cleaning the spill since the user is not experienced in cleaning chemical spills. Further, a group of individuals with knowledge and experience regarding proper chemical cleaning are identified and notified of the spill. One or more of the individuals can offer to or be selected to clean the spill.

The identified activities can be used to generate a lifelog for a user, which can include each identified activity with a date and time performed, as well as location and outcome of the activity. The lifelog can be tracked via a mobile application and accessible to the user and any other authorized individuals associated with the user. In a further embodiment, the activities can be used for ethnographic introspection as a chart or a scrollable interactive display.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for distributed activity detection, comprising:
    a server comprising a hardware processor to train models;
    at least one of a mobile computing device and a sensor device to:
        process contextual data for a user performing an activity;
        extract features from the contextual data;
        compare the features with one or more of the models from the server and stored on the mobile computing device, wherein each model represents an activity;
        assign a confidence score to each model based on the comparison with the features, wherein the confidence score comprises a probability that model matches the features;
        receive from a user of the mobile computing device or sensor device an identifier for the features only when the confidence scores for a match of the features with each of the models are low;
        transmit the identifier and features to the server only when the confidence scores for a match of the features with each of the models are low; and
    the server to:
        receive from the mobile computing device or sensor device, the features and the identifier on the server only when the confidence scores for each model are low,
        train a new model on the server using the received features and the identifier; and
        send the new model to the mobile computing device or the sensor device,
    wherein providing the features and the identifier from the mobile computing device or sensor device to the server only when the confidence scores are low offsets processing expense of the server by performing activity detection on the mobile computing device or sensor device and training of new activity models on the server.

2. A system according to claim 1, wherein the mobile computing device further extracts further features from additional contextual data received, compares the further features generated from a set of stored models, assigns a confidence score to each model based on the comparison with the features, and assigns the activity associated with the model having the highest confidence score to the activity being performed by the user.

3. A system according to claim 2, wherein the mobile computing device further receives from the user an assignment of a different activity for the further features to replace the assigned activity associated with the model having the highest confidence score.

4. A system according to claim 1, wherein the mobile computing device further adds the new model to the models stored on the mobile computing device.

5. A system according to claim 1, wherein the mobile computing device further generates vectors for the features, wherein the vectors of the features are compared with the models on the mobile computing device.

6. A system according to claim 1, wherein the mobile computing device further transmits a request to the user of the mobile computing device to identify at least one of the activity being performed and the activity still being performed.

7. A system according to claim 6, wherein the request comprises a list of activities for selection by the user as the identifier of the activity.

8. A system according to claim 6, wherein the mobile computing device further receives from the user a typed identity of the activity as the identifier.

9. A system according to claim 1, further comprising:
    training the new model on the server using a combination of labeled population data indexed by activity label and the user's specific contextual data.

10. A system according to claim 1, wherein the feature extraction depends on a type of the contextual data.

11. A computer-implemented method for distributed activity detection, comprising:
    processing on a mobile computing device contextual data for a user performing an activity;
    extracting features from the contextual data via the mobile computing device;
    comparing the features with a set of models from a server and stored on the mobile computing device, wherein each model represents an activity;
    assigning a confidence score to each model based on the comparison with the features, wherein the confidence score comprises a probability that model matches the features;
    receiving from a user of the mobile computing device an identifier for the features only when the confidence scores for a match of the features with each of the models are low;
    transmitting the identifier and features from the mobile computing device to the server only when the confidence scores for a match of the features with each of the models are low;
    receiving the features and the identifier from the mobile computing device on the server only when the confidence scores for each model are low;
    training a new model on the server using the features; and
    sending from the server, the new model to the mobile computing device,
    wherein providing the features and the identifier from the mobile computing device to the server when the confidence scores are low offsets processing expense of the server by performing activity detection on the mobile computing device and training of new activity models on the server.

12. A method according to claim 11, further comprising:
    extracting further features from additional contextual data received;
    comparing the further features with the set of models stored on the mobile computing device;
    assigning a confidence score to each model based on the comparison with the features; and
    assigning the activity associated with the model having the highest confidence score to the activity being performed by the user.

13. A method according to claim 12, further comprising:
    receiving from the user an assignment of a different activity for the further features to replace the assigned activity associated with the model having the highest confidence score.

14. A method according to claim 11, further comprising:
adding the new model to the models stored on the mobile computing device.

15. A method according to claim 11, further comprising:
generating vectors for the features, wherein the vectors of the features are compared with the models on the mobile computing device.

16. A method according to claim 11, further comprising:
transmitting a request to the user of the mobile computing device to identify at least one of the activity being performed and the activity still being performed.

17. A method according to claim 16, wherein the request comprises a list of activities for selection by the user as the identifier of the activity.

18. A method according to claim 16, further comprising:
receiving from the user a typed identity of the activity as the identifier.

19. A method according to claim 11, further comprising:
training the new model on the server using a combination of labeled population data indexed by activity label and the user's specific contextual data.

20. A method according to claim 11, wherein the feature extraction depends on a type of the contextual data.

\* \* \* \* \*